(12) United States Patent
Mahoney et al.

(10) Patent No.: US 8,291,886 B2
(45) Date of Patent: Oct. 23, 2012

(54) ACTUATOR FLOW COMPENSATED DIRECT METERING FUEL CONTROL SYSTEM AND METHOD

(75) Inventors: Timothy D. Mahoney, Chandler, AZ (US); Jay R. Sims, Chandler, AZ (US); Richard Ling, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 932 days.

(21) Appl. No.: 11/706,910

(22) Filed: Feb. 12, 2007

(65) Prior Publication Data
US 2010/0064657 A1  Mar. 18, 2010

(51) Int. Cl.
*F02D 41/00* (2006.01)
(52) U.S. Cl. .......................... 123/399; 123/447; 123/497
(58) Field of Classification Search .................. 123/299, 123/364, 390, 399, 445–447, 495, 497; 701/100–103; 60/606
See application file for complete search history.

(56) References Cited

U.S. PATENT DOCUMENTS

| | | | | |
|---|---|---|---|---|
| 3,775,971 A * | 12/1973 | Gadefelt | | 60/606 |
| 3,961,199 A * | 6/1976 | Bronicki | | 290/52 |
| 3,996,747 A * | 12/1976 | Melchior | | 60/606 |
| 4,009,574 A * | 3/1977 | Melchior | | 60/606 |
| 4,018,053 A * | 4/1977 | Rudert et al. | | 60/606 |
| 4,026,115 A * | 5/1977 | Melchior et al. | | 60/614 |
| 4,089,173 A * | 5/1978 | Melchior et al. | | 60/606 |
| 4,114,379 A * | 9/1978 | Melchior et al. | | 60/606 |
| 4,125,999 A * | 11/1978 | Melchior | | 60/606 |
| 4,233,815 A * | 11/1980 | Melchior | | 60/606 |
| 4,372,121 A * | 2/1983 | Sokolov et al. | | 60/606 |
| 4,481,773 A * | 11/1984 | Sugito et al. | | 60/606 |
| 4,593,525 A * | 6/1986 | Mezger | | 60/606 |
| 4,616,481 A * | 10/1986 | Melchior et al. | | 60/606 |
| 4,785,635 A * | 11/1988 | Melchior et al. | | 60/606 |
| 5,029,442 A * | 7/1991 | Nishiyama | | 60/606 |
| 5,245,819 A * | 9/1993 | Kast | | 60/734 |
| 5,274,996 A | 1/1994 | Goff et al. | | |
| 5,303,684 A * | 4/1994 | Brown et al. | | 123/435 |
| 5,447,023 A | 9/1995 | Meisner et al. | | |
| 5,806,300 A | 9/1998 | Veilleux, Jr. et al. | | |
| 6,220,225 B1 | 4/2001 | Mencher et al. | | |
| 6,497,100 B2 | 12/2002 | Blot-Carretero et al. | | |
| 6,810,674 B2 | 11/2004 | Clements | | |
| 6,895,325 B1 * | 5/2005 | Munson, Jr. | | 701/100 |
| 6,959,536 B1 | 11/2005 | Maher | | |
| 2005/0016176 A1 | 1/2005 | Griffiths et al. | | |
| 2005/0147492 A1 * | 7/2005 | Mahoney et al. | | 415/148 |
| 2005/0217273 A1 | 10/2005 | Muramatsu et al. | | |
| 2005/0235957 A1 * | 10/2005 | Duncan | | 123/429 |
| 2006/0086094 A1 * | 4/2006 | Runkle et al. | | 60/779 |
| 2006/0217869 A1 * | 9/2006 | Horvath et al. | | 701/100 |
| 2007/0044768 A1 * | 3/2007 | Eick et al. | | 123/478 |
| 2007/0068169 A1 * | 3/2007 | Riley | | 60/778 |

(Continued)

Primary Examiner — John T. Kwon
Assistant Examiner — Johnny Hoang
(74) Attorney, Agent, or Firm — Ingrassia Fisher & Lorenz, P.C.

(57) ABSTRACT

A system and method for controlling the fuel flow rate in a direct metering fuel control system to compensate for actuator flow. The system includes a fuel metering pump that supplies fuel to a fluid-operated actuator and to a gas turbine engine combustor and determines, using a generated model of the fuel metering pump and/or the fluid-operated actuator, fuel flow rate needed by the gas turbine engine and/or the actuator fuel flow rate needed by the fluid-operated actuator. The fuel flow rate of the fuel metering pump is controlled based on the determined actuator fuel flow rate and the determined engine fuel flow rate.

17 Claims, 3 Drawing Sheets

U.S. PATENT DOCUMENTS

2007/0089425 A1* 4/2007 Motter et al. .................. 60/775
2007/0151258 A1* 7/2007 Gaines et al. .................. 60/792
2007/0234702 A1* 10/2007 Hagen et al. ................. 60/39.01
2008/0134684 A1* 6/2008 Umeh et al. ................... 60/772

* cited by examiner

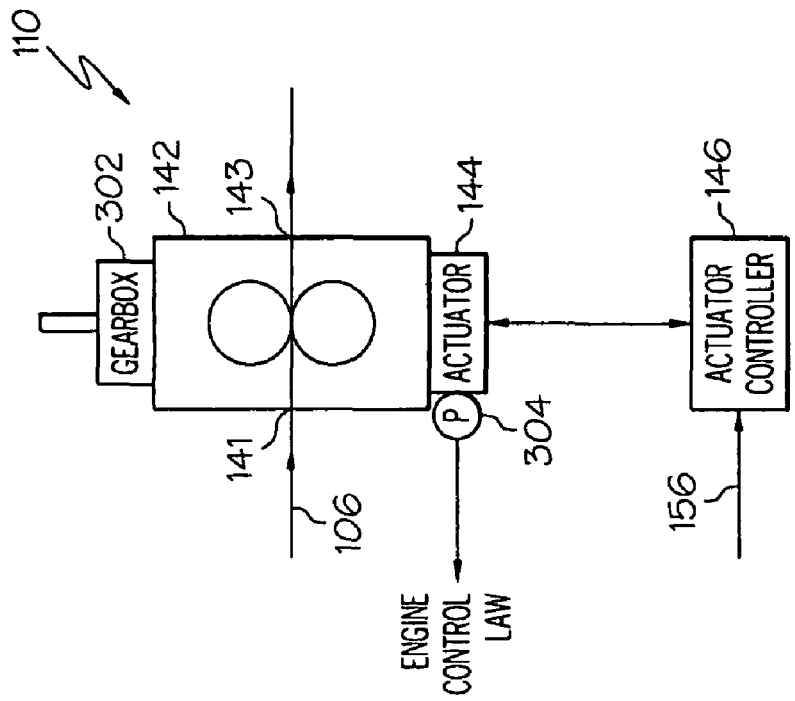
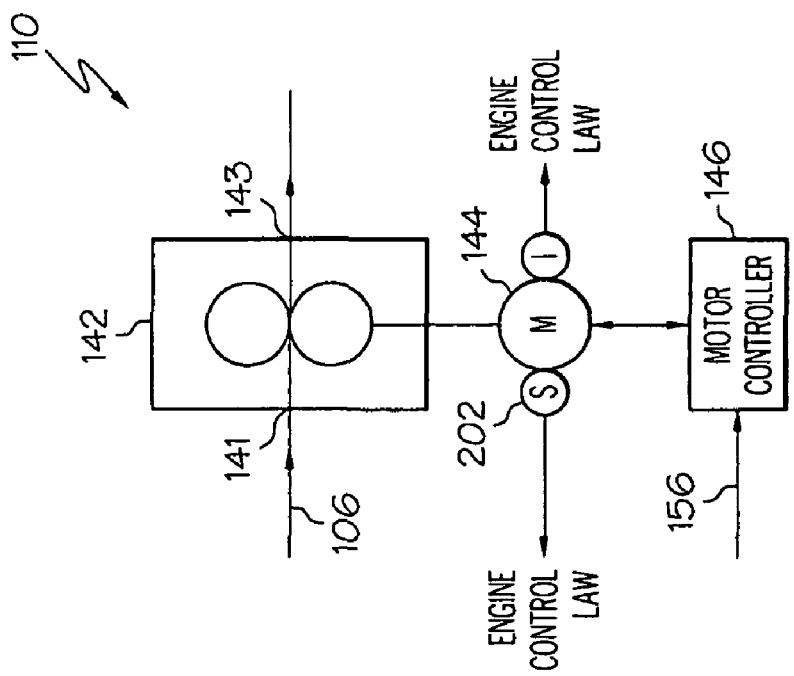

ACTUATOR FLOW COMPENSATED DIRECT METERING FUEL CONTROL SYSTEM AND METHOD

TECHNICAL FIELD

The present invention relates to gas turbine engine direct metering fuel control and, more particularly, to a system and method of providing actuator flow compensated direct metering fuel control.

BACKGROUND

Many gas turbine engine fuel supply systems include a fuel source, such as a fuel tank, and one or more pumps that draw fuel from the fuel source and deliver pressurized fuel to the fuel manifolds in the engine combustor via a main supply line. The main supply line may include one or more valves in flow series between the pumps and the fuel manifolds. These valves generally include, for example, a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is typically controlled by a head regulation scheme to maintain a substantially fixed differential pressure across the main metering valve.

The above-described fuel supply system is generally safe, reliable, and robust. Nonetheless, it can suffer certain drawbacks. For example, the metering valve and bypass valve can add to overall system weight and complexity. Moreover, control of the metering valve and bypass valve can result in increased system complexity and cost. Thus, in recent years there has been a desire to implement more direct metering fuel control systems. In such systems fuel flow rate is controlled by controlling, for example, the speed or the displacement of the fuel metering pump. Yet, efforts to implement direct fuel metering control systems have also been impeded by the certain drawbacks. For example, many gas turbine engines include one or more fluid-operated actuators. In many instances these actuators are driven by the fuel from the fuel supply system. Thus, actuator operation can cause a droop in the fuel supplied to the engine, and thus an undesirable engine speed droop. It is also postulated that such fuel supply variations to the engine could yield unpredictable, and potentially less controllable, engine transients.

Hence, there is a need for a system and method of controlling fuel flow in a direct metering fuel control system and does not cause, or that at least substantially lessens, fuel supply variations to the engine and/or does not yield unpredictable and/or relatively less controllable engine transients. The present invention addresses one or more of these needs.

BRIEF SUMMARY

The present invention provides a system and method of controlling fuel flow in a direct metering fuel control system that compensates for actuator flow control.

In one embodiment, and by way of example only, a method of controlling fuel flow rate supplied by a fuel metering pump to a fluid-operated actuator and to a combustor in a gas turbine engine includes generating a pump model of the fuel metering pump, and generating an actuator model of the fluid-operated actuator. An engine fuel flow rate needed by the gas turbine engine combustor and an actuator fuel flow rate needed by the fluid-operated actuator are determined using both the pump model and the actuator model. The fuel flow rate supplied by the fuel metering pump is controlled based on the determined engine fuel flow rate and the determined actuator fuel flow rate.

In another exemplary embodiment, a system for controlling fuel flow rate to a fluid-operated actuator and to a combustor in a gas turbine engine includes a fuel metering pump and a control unit. The fuel metering pump is coupled to receive a pump command representative of a desired fuel flow rate, and is operable, upon receipt of the pump command, to supply fuel at the desired fuel flow rate. The control unit has a pump model of the fuel metering pump and an actuator model of the fluid-operated actuator stored therein. The control unit is configured to determine, using the pump model and the actuator model, the engine fuel flow rate needed by the combustor and the actuator fuel flow rate needed by the fluid-powered actuator, determine the desired fuel flow rate from the determined engine fuel flow rate and the determined actuator fuel flow rate, and supply the pump command to the fuel metering pump.

In yet another exemplary embodiment, a method of controlling fuel flow rate of a fuel metering pump that supplies fuel to a fluid-operated actuator and to a gas turbine engine combustor includes generating an actuator model of the fluid-operated actuator and determining, using the actuator model, an actuator fuel flow rate needed by the fluid-operated actuator. The engine fuel flow rate needed by the gas turbine engine combustor is determined, and the fuel flow rate of the fuel metering pump is controlled based on the determined actuator fuel flow rate and the determined engine fuel flow rate.

In still a further exemplary embodiment, a system for controlling fuel flow rate to a fluid-operated actuator and to a gas turbine engine combustor includes a fuel metering pump and a control circuit. The fuel metering pump is coupled to receive a fuel flow rate command representative of a commanded fuel flow rate, and is operable, upon receipt of the fuel flow rate command, to supply fuel at the commanded fuel flow rate. The control circuit has an actuator model of the fluid-operated actuator stored therein, and is configured to determine engine fuel flow rate needed by the combustor, use the actuator model to determine actuator fuel flow rate needed by the fluid-powered actuator, determine the commanded fuel flow rate from the determined engine fuel flow rate and the determined actuator fuel flow rate, and supply the fuel flow rate command to the fuel metering pump.

Other independent features and advantages of the preferred direct metering fuel control system and method will become apparent from the following detailed description, taken in conjunction with the accompanying drawings which illustrate, by way of example, the principles of the invention.

BRIEF DESCRIPTION OF THE DRAWINGS

FIG. 2 is a block diagram of a fuel metering pump that may be used in the system of FIG. 1, and implemented as a fixed (positive) displacement pump driven by a variable speed motor with flow output set by motor control;

FIG. 3 is a block diagram of a fuel metering pump that may be used in the system of FIG. 1, and implemented as a variable displacement pump driven by an engine gearbox over a range of speeds with flow output controlled by a separate actuator.

DETAILED DESCRIPTION OF VARIOUS PREFERRED EMBODIMENTS

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
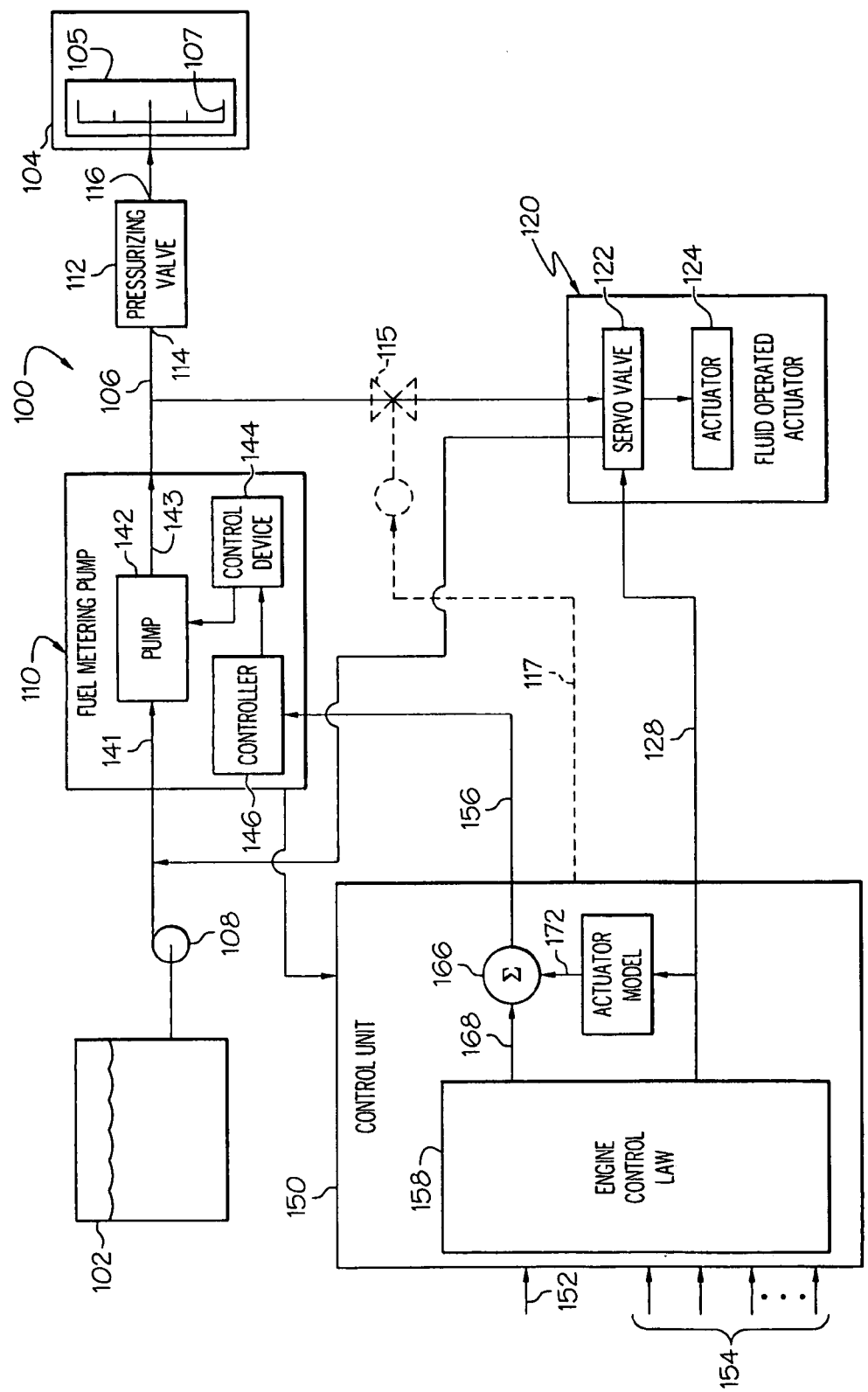
FIG. 1 is a block diagram of a direct metering fuel control system for a gas turbine engine according to one exemplary embodiment of the present invention.

A direct metering fuel control system for a gas turbine engine, such as a turbofan jet aircraft engine, according to one exemplary embodiment, is depicted in FIG. 1. The system 100 includes a fuel source 102, such as a tank, that stores the fuel supplied to a gas turbine engine 104, and more specifically a combustor 105 in the gas turbine engine 104. A supply line 106 is coupled to the fuel source 102 and, via various components, delivers the fuel to the combustor 105 via a plurality of fuel nozzles 107. It is noted that the supply line 106 is, for convenience, depicted and described with a single reference numeral. However, it will be appreciated that the system 100 may be implemented using separate sections of piping, though a single section is certainly not prohibited.

One or more pumps are positioned in flow-series in the supply line 106 and draw fuel from the fuel source 102. In the depicted embodiment, a booster pump 108, such as a relatively low horsepower centrifugal pump, and a high pressure fuel metering pump 110 are used. The booster pump 108 draws fuel directly from the fuel source 102 and provides sufficient suction head for the fuel metering pump 110. The fuel metering pump 110 in turn supplies fuel at a relatively high pump discharge pressure, such as up to 1200 psig, to the remainder of the supply line 106. The booster pump 108 may be either mechanically driven by the engine, or electrically driven by a non-illustrated motor. Moreover, the booster pump 108 may, in some embodiments, not be included. More detailed descriptions of various embodiments of the fuel metering pump 110 are provided further below.

A pressurizing valve 112, which is sometimes referred to as a pressurizing-and-shutoff valve, is positioned in flow-series in the supply line 106 downstream of the fuel metering pump 110, and functions to ensure a minimum system pressure magnitude is in the supply line 106 downstream of the fuel metering pump 110. The pressurizing valve 112 includes an inlet 114 that is in fluid communication with the fuel metering pump 110 and an outlet 116 that is in fluid communication with the combustor 105, and is movable between a closed position and an open position. In the closed position the pressurizing valve inlet 114 is not in fluid communication with the pressurizing valve outlet 116, and fuel flow through the pressurizing valve 112 and to the combustor 105 is prohibited. Conversely, when the pressurizing valve 112 is in the open position, the pressurizing valve inlet 114 is in fluid communication with the pressurizing valve fluid outlet 116, and fuel flow through the pressurizing valve 112 may occur. The pressurizing valve 112 is configured to move from its closed position to an open position when the fuel metering pump discharge pressure reaches a predetermined pressure, and is further configured to move to the closed position when the fuel metering pump discharge pressure falls below the predetermined pressure. It will be appreciated that the pressurizing valve 112 may not be included in some embodiments.

A fluid-operated actuator 120 is also disposed downstream of, and at least selectively receives a flow of fuel from, the fuel metering pump 110. It will be appreciated that for clarity and ease of illustration only a single fluid-operated actuator 120 is depicted in FIG. 1. However, more than one fluid-operated actuator could be disposed downstream of the fuel metering pump 110. The depicted fluid-operated actuator 120, which is merely exemplary of any one of numerous types of fluid-operated actuators, includes a servo valve 122 and an actuator 124. The servo valve 122 is disposed between the fuel metering pump 110 and the actuator 124, and selectively controls the flow rate of fuel to the actuator 124. The actuator 124, in response to the supplied fuel, supplies an actuation drive force to one or more devices such as, for example, one or more non-illustrated valves. The servo valve 122 is configured to be responsive to actuator position commands 128, which are supplied thereto from a control unit 150.

The control unit 150, which may be implemented within an engine controller, such as a Full Authority Digital Engine Controller (FADEC) or other electronic engine controller (EEC), controls the flow rate of fuel to the combustor 105 and the fluid-operated actuator 120. To do so, the control unit 150 receives various input signals and controls the operation of the fuel metering pump 110, and thus the fuel flow rate, accordingly. In particular, the control unit 150 receives an engine speed command signal 152 and one or more operational parameter signals 154. The engine speed command signal 152, which is representative of a desired engine speed, is supplied from, for example, throttle control equipment (not illustrated) in the cockpit. The operational parameter signals 154 may be supplied from, for example, one or more non-illustrated sensors, and are representative of various operational parameters, such as engine speed, one or more engine temperatures, one or more engine pressures, and ambient temperature, just to name a few. The control unit 150 is configured, in response to these signals, to determine the fuel flow rate needed by the fluid-operated actuator 120 and the fuel flow rate needed by the combustor 105. The control unit 150 is further configured, based on these determinations, to supply a pump command 156 to the fuel metering pump 110 that is representative of the combined fuel flow rate needed by the combustor 105 and the fluid-operated actuator 120. In response to the pump command 156, and as will be described in more detail further below, the fuel metering pump 110 supplies fuel at the combined fuel flow rate for distribution to the combustor 105 and the fluid-operated actuator 120.

The control unit 150, in order to implement the above-described functionality, includes an engine control law 158, an actuator model 164, and a summer 166. It will be appreciated that in other embodiments, the control unit 150 may not include one or more of these functions. Instead, one or more of these functions could be implemented in other portions of the system. Nonetheless, the engine control law 158, which may be implemented using any one of numerous known types of engine control laws 158, is coupled to receive the engine speed command signal 152. The engine control law 158, upon receipt of the engine speed command signal 152, determines the engine fuel flow rate needed by the combustor 105, and supplies an engine fuel flow rate command 168 that is representative thereof to the summer 166. It will be appreciated that in some embodiments the engine control law 158 may also receive, and be responsive to, one or more of the operational parameter signals 154.

The engine control law 158 is additionally configured to supply the actuator position commands 128 to the fluid-operated actuator 120. More specifically, and as was noted above, the actuator position commands 128, which are representative of a desired position to which the actuator 124 is to move, are supplied to the servo valve 122 to control fuel flow to the actuator 124 and thus move the actuator 124 to the desired position. As FIG. 1 further depicts, the engine control law 158 also supplies the actuator position commands 128, or at least signals representative thereof, to the actuator model 164.

The actuator model 164 is preferably a software model of the fluid-operated actuator 120, and is preferably stored within the control unit 150. The actuator model 164 is responsive to at least the actuator position commands 128 that are supplied thereto from the engine control law 158 to determine the fuel flow rate needed by the fluid-operated actuator 120. The actuator model 164 also supplies an actuator fuel flow rate command 172, which is representative of the determined fuel flow rate needed by the fluid-operated actuator 120, to the summer 166.

The actuator model 164 accounts for at least actuator fuel flow rate as a function of the actuator position commands. The actuator model 164 also preferably implements derivative anticipation logic, preferably determines actuator inlet conditions, and preferably includes leakage estimates. The derivative anticipation logic, which may be implemented, for example, using a control law lead term, is responsive to one or more of the operational parameter signals 154 to determine the rate of change of the operational parameters, to thereby anticipate fuel load transients to either the engine, the fluid-operated actuator 120, or both. The actuator model 164 preferably determines actuator inlet conditions, such as servo valve inlet pressure, to supply more accurate actuator fluid flow commands 172. It will be appreciated that the actuator inlet conditions can be determined from actual physical measurements or predicted from various other system parameters such as, for example, one or more engine parameters.

The summer 166 is coupled to receive the engine fuel flow rate command 168 and the actuator fuel flow rate command 172. The summer 166, upon receipt of these signals, supplies the pump command 156. It will be appreciated that the pump command 156 supplied by the summer 166 is preferably representative of an arithmetic summation of the engine fuel flow rate command 168 supplied from the engine control law 158, and the actuator fuel flow rate command 172 supplied from the actuator model 164. It will additionally be appreciated that the pump command 156 could be representative of various other mathematical operations or signal combination functions. Moreover, it is noted that the pump command 156, the engine fuel flow rate command 168, and the actuator fuel flow rate command 172 could be implemented in various forms to yield the desired flow output from the fuel metering pump 110. For example, and as will become apparent from the descriptions further below, these commands could be implemented such that the resultant pump command 156 is a motor speed command, an actuator stroke command, or an actuator slew rate command, just to name a few variations. In any case, the pump command 156 is supplied to the fuel metering pump 110.

Before proceeding with a description of the fuel metering pump, it is noted that during an engine-start sequence the uncertainties associated with the actuator model leakage estimates, at least in some embodiments, can be relatively high as compared to light-off and burn flow. Hence, for such embodiments, fuel flow to the fluid-operated actuators 120 that do not need to be moved during the engine-start sequence can be shut-off. This function may be implemented using any one of numerous techniques. For example, the system 100 may include one or more priority valves 115, one of which is depicted in phantom in FIG. 1, between the fuel metering pump 110 and the fluid-operated actuator 120. The priority valve 115 is preferably coupled to receive valve position commands 117 from, for example, the control unit 150, and is movable, in response to the valve position commands 117, between a closed position and an open position. In the closed position the fluid-operated actuator 120 is fluidly isolated from the fuel metering pump 110, and in the open position the fluid-operated actuator 120 is in fluid communication with the fuel metering pump.

It will be appreciated that for systems 100 that include one or more priority valves 115, the control unit 150 is further configured to determine if the engine is undergoing an engine-start sequence and, based on this determination, to selectively supply the valve position commands 117 to the priority valve 115. In particular, if the if the engine is undergoing the engine-start sequence the control unit 150 will at least selectively supply valve position commands 117 to the priority valve 115 that cause the priority valve 115 to move to the closed position. Conversely, if the engine is not undergoing the engine-start sequence the control unit 150 will at least selectively supply valve position commands to the priority valve 115 that cause the priority valve 115 to move to the open position. It will additionally be appreciated that the priority valve 115 could be moved to the closed position for various other operating conditions, if shut-off of fuel flow to the servo valve 122 is needed or desired.

Turning now to a more detailed description of the fuel metering pump 110, it is seen that the fuel metering pump 110 preferably includes a positive displacement pump 142, a flow control device 144, and a pump controller 146. The pump 142 is preferably driven by either an electric motor or an engine gearbox. The pump 142, as was noted above, is preferably a positive displacement pump, such as a gear pump, a piston pump, a diaphragm pump, or any one of numerous other types of positive displacement pumps, and includes an inlet 141 and an outlet 143. The pump 142, upon being energized, draws fuel into the inlet 141 and supplies fuel, at the commanded fuel flow rate, via the outlet 143. It will be appreciated that the flow rate at which the pump 142 supplies fuel is controlled by the control device 144.

The control device 144, as was just noted, functions to control at least the rate at which the pump 142 supplies fuel. As will be described in more detail further below, the control device 144 may be implemented using various devices and various configurations. No matter its specific implementation, however, the control device 144 is controlled by the pump controller 146. More specifically, the pump controller 146 is coupled to receive the pump command 156 supplied by the control unit 150. The pump controller 146, in response to the pump command 156, supplies signals that appropriately control the control device 144 to in turn control the fuel flow rate supplied by the pump 142. Various specific implementations of the control device 144, and thus various specific implementations of the fuel metering pump 110, will now be described.

Referring now to FIG. 2, the fuel metering pump 110 depicted therein is implemented as a variable speed, positive displacement pump. More specifically, although the pump 142 is still being implemented as any one of numerous types of positive displacement pumps, the functionality of the control device 144 is implemented by a motor, and the pump controller 146 implements at least a motor controller. With this embodiment the pump command 156 is a motor speed command and the pump controller 146, in response to the pump command 156, controls the supply of electrical current to the motor 144, to thereby control the rotational speed of the motor 144. As is generally known, positive displacement pumps exhibit generally linear flow versus speed characteristics. Thus, the motor speed, and the concomitant drive force supplied by the motor 144 to the pump 142, is controlled such that the pump 142 supplies fuel at the fuel flow rate determined by the control unit 150. As with the general embodiment described above, it will be appreciated that the motor 144 may be implemented as any one of numerous types of AC or DC motors, but is preferably implemented as a brushless DC motor. As such, and as FIG. 2 additionally depicts, a speed sensor 202 and a current sensor 204 may be included to sense motor rotational speed and motor current, respectively, and supply appropriate feedback signals to, for example, the engine speed control law 158.

In other embodiments, such as the one depicted in FIG. 3, the fuel metering pump 110 is implemented as an engine-gearbox-driven, variable displacement pump. More specifically, the pump 142 is implemented as any one of numerous types of variable displacement pumps, such as a variable displacement vane pump, or a variable displacement piston pump, just to name a few. Moreover, the functionality of the control device 144 is implemented using a displacement control actuator and the pump controller 146 implements at least an actuator controller. With this embodiment the pump 142 is driven by an engine gearbox 302 over a wide range of speeds, and the pump command 156 is an actuator stroke or actuator slew rate command. The pump controller 146, in response to the pump command 156, supplies actuator control signals to the displacement control actuator 144. The displacement control actuator 144 is coupled to the pump 142 and, upon receipt of the actuator control signals and in a known manner, controls the displacement of the pump 142 such that the pump 142 supplies fuel at the fuel flow rate determined by the control unit 150. It will be appreciated that the actuator 144 may be implemented using any one of numerous types of electromechanical, electro-hydraulic, or electro-pneumatic type actuators, and may be selected based, for example, on the particular type of variable displacement pump that is used. It will additionally be appreciated that the pump controller 146 could be variously implemented. For example, in one embodiment, the actuator 144 and controller 146 could be implemented similar to the actuator 124 and the servo valve 122, respectively, that are used to implement the fluid-operated actuator 120. Moreover, and as FIG. 3 additionally depicts, a position sensor 304 may be included that senses actuator position and supplies a position feedback signal to, for example, the engine speed control law 158.

The control unit 150 depicted in FIG. 1 and described above compensates the engine fuel flow rate commands 158 for the effects caused by the actuator position commands 128. However, the control unit 150 is not configured to accurately compensate the engine fuel flow rate command 158 when a constant actuator position command 128 is being supplied to the fluid-operated actuator 120 and a significant change in the engine fuel flow rate command 158 occurs. To accurately compensate for the disturbance effects between engine fuel flow and actuator fuel flow, multi-input, multi-output (MIMO) control may be implemented. An example embodiment of MIMO control that may be included in the system 100 is depicted in FIG. 4, and will now be described.

Figure 4:
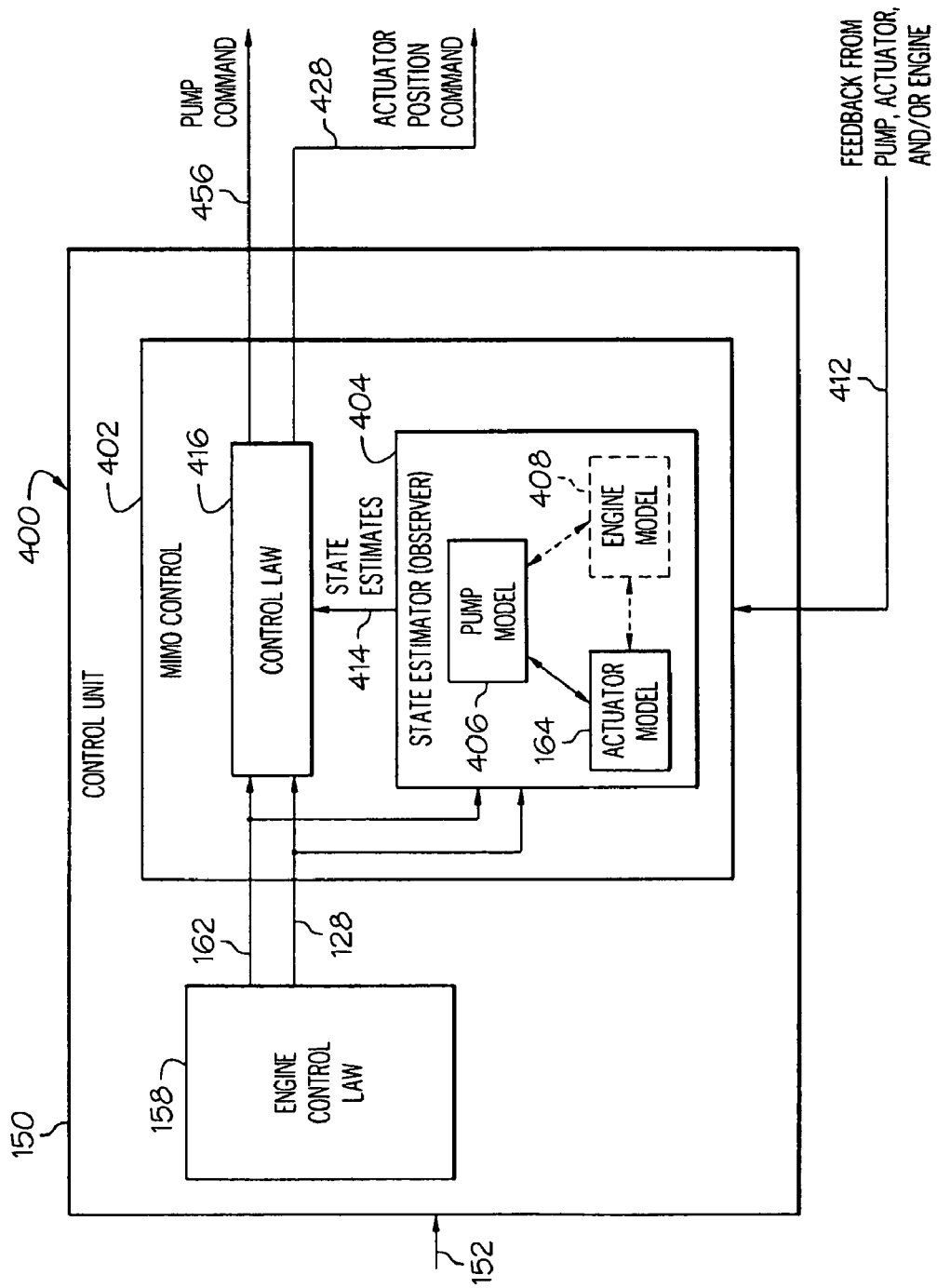
FIG. 4 is a block diagram of a direct metering fuel control system for a gas turbine engine according to an alternative exemplary embodiment of the present invention.

The control unit 400 of FIG. 4 includes the previously-described engine control law 158, and additionally includes MIMO control 402. The MIMO control 402 receives both the engine fuel flow rate commands 168 and the actuator position commands 128 from the engine control law 158, and supplies an appropriate pump command 456 to the fuel metering pump 110 and an appropriate actuator control command 428 to the fluid-operated actuator 120.

The MIMO control 402 includes a state estimator (or observer) 404 that includes not only the actuator model 164, but additionally includes a pump model 406. Moreover, as depicted in phantom in FIG. 4, the MIMO control 402 may further include an engine model 408. The actuator model 164 is preferably identical, or at least substantially identical, to the one depicted in FIG. 1 and described above; however, in addition to the previously described features, the actuator model also intercommunicates with the pump model 406 and, if included, the engine model 408. The pump model 406 and engine model 408 are preferably software models of the fuel metering pump 110 and the non-illustrated engine. Similar to the embodiment of FIG. 1, the actuator model 164, pump model 406, and optional engine model 408 are all preferably stored within the control unit 400. The pump model 406 and engine model 408 also intercommunicate with each other and with the actuator model 164.

The state estimator 404 additionally receives the engine fuel flow rate commands 168 and the actuator position commands 128 from the engine control law 158, and may also receive feedback signals 412 from various non-illustrated sensors in the fuel metering pump 110, the fluid-operated actuator 120, and the non-illustrated engine. These feedback signals 412 may include one or more of the previously described signals that may be supplied from the fuel metering pump 110, the fluid-operated actuator 120, and non-illustrated engine. The state estimator 404, and more specifically each of the models 164, 406, 408, is responsive to the commands 168, 128 and the feedback signals 412 to generate various state estimates 414 of at least the fuel metering pump 110 and the fluid-operated actuator 120. The state estimator 404 may also determine various state estimates of the non-illustrated engine. In any case, the state estimates 414 generated by the state estimator 404 are supplied to a control law 416.

The control law 416, in addition to receiving the state estimates 416, also receives the engine fuel flow rate commands 168 and the actuator position commands 128 from the engine control law 158. In response to the commands 168, 128 and the state estimates 416, the control law supplies the pump command 456 to the fuel metering pump 110 and the actuator control command 428 to the fluid-operated actuator 120.

In presently known gas turbine engine fuel supply systems, a single command is supplied to the pump for engine speed control, and a single command is supplied to the actuator to control actuator position. These presently known systems also implement a fast response, mechanical fuel bypass loop to stabilize flow perturbations that may be caused by transients of the various system components. The MIMO control 402 that is implemented by the control unit 400 in FIG. 4 stabilizes these flow perturbations in direct metering fuel systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for controlling fuel flow rate to a fluid-operated actuator and to a combustor in a gas turbine engine, comprising:
   a fuel metering pump coupled to receive fuel, and further coupled to receive a pump command representative of a desired fuel flow rate, the fuel metering pump operable, upon receipt of the pump command, to supply fuel at the desired fuel flow rate;

a control unit including a control law and a state estimator, the state estimator comprising a software model of the fuel metering pump and an software model of the fluid-operated actuator, wherein:
the state estimator coupled to receive an engine fuel flow rate command and an actuator position command and operable to supply state estimates of the fuel metering pump and the fluid-operated actuator, and the control law is coupled to receive the engine fuel flow rate command, the actuator position command, and the state estimates, and is configured, in response to the engine fuel flow rate command, the actuator position command, and the state estimates, to supply the pump command to the fuel metering pump and an actuator control command to the fluid-operated actuator.

2. The system of claim 1, wherein the control unit:
includes an engine model of the gas turbine engine; and
determines, using the pump model, the actuator model, and the engine model, the engine fuel flow rate needed by the combustor and the actuator fuel flow rate needed by the fluid-powered actuator.

3. The system of claim 1, further comprising the fluid-operated actuator, and wherein the fluid-powered actuator comprises:
an actuator coupled to selectively receive fuel at the actuator fuel flow rate and operable, upon receipt thereof, to supply an actuation drive force; and
a servo valve coupled to receive fuel supplied by the fuel metering pump, the servo valve further coupled to receive the actuator control command and operable, upon receipt thereof, to selectively supply the received fuel, at the actuator fuel flow rate, to the actuator.

4. The system of claim 1, wherein the fuel metering pump comprises:
a positive displacement pump having an inlet and an outlet, the inlet adapted to receive fuel, the positive displacement pump coupled to receive a drive force and operable, upon receipt thereof, to supply fuel via the outlet;
an electric motor coupled to the positive displacement pump and adapted to receive electrical current, the electric motor configured, upon receipt of the electrical current, to supply the drive force to the positive displacement pump; and
a pump controller coupled to receive the pump command and operable, in response thereto, to control the electrical current supplied to the electric motor such that the drive force supplied by the electric motor causes the positive displacement pump to supply fuel at the desired fuel flow rate.

5. The system of claim 1, wherein the fuel metering pump comprises:
a variable displacement pump having an inlet, an outlet, the inlet adapted to receive fuel, the variable displacement pump coupled to receive a drive force and operable, upon receipt thereof, to supply fuel via the outlet;
a pump controller coupled to receive the pump command and operable, in response thereto, to supply actuator control signals; and
a pump displacement control actuator coupled to the variable displacement pump and further coupled to receive the actuator control signals, the pump displacement control actuator configured, upon receipt of the actuator control signals, to control the displacement of the variable displacement pump such that the variable displacement pump supplies fuel at the desired fuel flow rate.

6. A system for controlling fuel flow rate to a fluid-operated actuator and to a combustor in a gas turbine engine, comprising:
a fuel metering pump coupled to receive fuel, and further coupled to receive a pump command representative of a desired fuel flow rate, the fuel metering pump operable, upon receipt of the pump command, to supply fuel at the desired fuel flow rate;
a control unit having a pump model of the fuel metering pump and an actuator model of the fluid-operated actuator stored therein, wherein the pump model is a software model of the fuel metering pump and the actuator model is a software model of the fluid-operated actuator, the control unit configured to:
(i) determine, using the pump model and the actuator model, engine fuel flow rate needed by the combustor and actuator fuel flow rate needed by the fluid-powered actuator,
(ii) determine the desired fuel flow rate from the determined engine fuel flow rate and the determined actuator fuel flow rate, and
(iv) supply the pump command to the fuel metering pump,
wherein the fuel metering pump comprises:
a positive displacement pump having an inlet and an outlet, the inlet adapted to receive fuel, the positive displacement pump coupled to receive a drive force and operable, upon receipt thereof, to supply fuel via the outlet,
an electric motor coupled to the positive displacement pump and adapted to receive electrical current, the electric motor configured, upon receipt of the electrical current, to supply the drive force to the positive displacement pump, and
a pump controller coupled to receive the pump command and operable, in response thereto, to control the electrical current supplied to the electric motor such that the drive force supplied by the electric motor causes the positive displacement pump to supply fuel at the desired fuel flow rate.

7. The system of claim 6, wherein:
the pump model and the actuator model are each coupled to simultaneously receive an engine fuel flow rate command and an actuator position command, the actuator position command representative of a position to which the fluid-operated actuator is to be moved; and
the pump model and the actuator model determine the engine fuel flow rate and the actuator fuel flow rate based at least in part on the engine fuel flow rate command and the actuator position command.

8. The system of claim 7, wherein the control unit:
includes an engine model of the gas turbine engine; and
determines, using the pump model, the actuator model, and the engine model, the engine fuel flow rate needed by the combustor and the actuator fuel flow rate needed by the fluid-powered actuator.

9. The system of claim 7, wherein the control unit includes:
a state estimator that comprises the pump model and the actuator model, the state estimator operable to supply state estimates of the fuel metering pump and the fluid-operated actuator; and
a control law coupled to receive the engine fuel flow rate command, the actuator position command, and the state estimates, the control law configured, in response to the engine fuel flow rate command, the actuator position command, and the state estimates, to supply the pump command to the fuel metering pump and an actuator control command to the fluid-operated actuator.

10. The system of claim 9, further comprising the fluid-operated actuator, and wherein the fluid-powered actuator comprises:
    an actuator coupled to selectively receive fuel at the actuator fuel flow rate and operable, upon receipt thereof, to supply an actuation drive force; and
    a servo valve coupled to receive fuel supplied by the fuel metering pump, the servo valve further coupled to receive the actuator control command and operable, upon receipt thereof, to selectively supply the received fuel, at the actuator fuel flow rate, to the actuator.

11. The system of claim 10, wherein the control unit includes:
    an engine control law configured to selectively supply the engine fuel flow rate command and the actuator position commands.

12. The system of claim 10, further comprising:
    a priority valve disposed between the fuel metering pump and the fluid-operated actuator, the priority valve coupled to receive valve position commands and movable, in response to the valve position commands, between a closed position, in which the fluid-operated actuator is fluidly isolated from the fuel metering pump, and an open position, in which the fluid-operated actuator is in fluid communication with the fuel metering pump,
    wherein the control unit is further configured to:
        determine if the engine is undergoing an engine-start sequence,
        supply valve position commands to the priority valve that cause the priority valve to move to the closed position if the engine is undergoing the engine-start sequence, and
        supply valve position commands to the priority valve that cause the priority valve to move to the open position if the engine is not undergoing the engine-start sequence.

13. A system for controlling fuel flow rate to a fluid-operated actuator and to a combustor in a gas turbine engine, comprising:
    a fuel metering pump coupled to receive fuel, and further coupled to receive a pump command representative of a desired fuel flow rate, the fuel metering pump operable, upon receipt of the pump command, to supply fuel at the desired fuel flow rate;
    a control unit having a pump model of the fuel metering pump and an actuator model of the fluid-operated actuator stored therein, wherein the pump model is a software model of the fuel metering pump and the actuator model is a software model of the fluid-operated actuator, the control unit configured to:
        (i) determine, using the pump model and the actuator model, engine fuel flow rate needed by the combustor and actuator fuel flow rate needed by the fluid-powered actuator,
        (ii) determine the desired fuel flow rate from the determined engine fuel flow rate and the determined actuator fuel flow rate, and
        (iv) supply the pump command to the fuel metering pump,
    wherein the fuel metering pump comprises:
        a variable displacement pump having an inlet, an outlet, the inlet adapted to receive fuel, the variable displacement pump coupled to receive a drive force and operable, upon receipt thereof, to supply fuel via the outlet,
        a pump controller coupled to receive the pump command and operable, in response thereto, to supply actuator control signals, and
        a pump displacement control actuator coupled to the variable displacement pump and further coupled to receive the actuator control signals, the pump displacement control actuator configured, upon receipt of the actuator control signals, to control the displacement of the variable displacement pump such that the variable displacement pump supplies fuel at the desired fuel flow rate.

14. The system of claim 13, wherein:
    the pump model and the actuator model are each coupled to simultaneously receive an engine fuel flow rate command and an actuator position command, the actuator position command representative of a position to which the fluid-operated actuator is to be moved; and
    the pump model and the actuator model determine the engine fuel flow rate and the actuator fuel flow rate based at least in part on the engine fuel flow rate command and the actuator position command.

15. The system of claim 14, wherein the control unit:
    includes an engine model of the gas turbine engine; and
    determines, using the pump model, the actuator model, and the engine model, the engine fuel flow rate needed by the combustor and the actuator fuel flow rate needed by the fluid-powered actuator.

16. The system of claim 14, wherein the control unit includes:
    a state estimator that comprises the pump model and the actuator model, the state estimator operable to supply state estimates of the fuel metering pump and the fluid-operated actuator; and
    a control law coupled to receive the engine fuel flow rate command, the actuator position command, and the state estimates, the control law configured, in response to the engine fuel flow rate command, the actuator position command, and the state estimates, to supply the pump command to the fuel metering pump and an actuator control command to the fluid-operated actuator.

17. The system of claim 16, further comprising the fluid-operated actuator, and wherein the fluid-powered actuator comprises:
    an actuator coupled to selectively receive fuel at the actuator fuel flow rate and operable, upon receipt thereof, to supply an actuation drive force; and
    a servo valve coupled to receive fuel supplied by the fuel metering pump, the servo valve further coupled to receive the actuator control command and operable, upon receipt thereof, to selectively supply the received fuel, at the actuator fuel flow rate, to the actuator.

* * * * *